United States Patent
Lennartson et al.

(10) Patent No.: US 8,064,901 B2
(45) Date of Patent: Nov. 22, 2011

(54) EXPERT SYSTEM

(75) Inventors: Benny Lennartson, Hägersten (SE); Krister Sundberg, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 782 days.

(21) Appl. No.: 12/091,968

(22) PCT Filed: May 2, 2006

(86) PCT No.: PCT/SE2006/050091
§ 371 (c)(1),
(2), (4) Date: Apr. 29, 2008

(87) PCT Pub. No.: WO2007/058606
PCT Pub. Date: May 24, 2007

(65) Prior Publication Data
US 2008/0261587 A1    Oct. 23, 2008

(30) Foreign Application Priority Data
Nov. 16, 2005 (SE) ........................ 0502520

(51) Int. Cl.
H04W 24/00 (2009.01)
(52) U.S. Cl. ...... 455/424; 455/423; 455/425; 455/422.1

(58) Field of Classification Search ................. 455/424, 455/423, 425, 422.1
See application file for complete search history.

(56) References Cited

U.S. PATENT DOCUMENTS

| | | | |
|---|---|---|---|
| 5,970,394 A | 10/1999 | Arpee | |
| 6,266,528 B1 | 7/2001 | Farzaneh | |
| 6,961,545 B2 * | 11/2005 | Tehrani et al. | 455/101 |
| 7,024,155 B2 * | 4/2006 | Gosieski, Jr. | 455/3.01 |
| 2004/0127261 A1 | 7/2004 | Endress | |
| 2006/0128372 A1 * | 6/2006 | Gazzola | 455/424 |

* cited by examiner

Primary Examiner — Nghi Ly
(74) Attorney, Agent, or Firm — Roger S. Burleigh (57) ABSTRACT

Systems and methods for remotely evaluating antenna installations in a mobile radio communication system, wherein each antenna installation comprises at least one pair of antenna elements arranged for diversity reception. The received signal strength from a plurality of mobile stations is measured at the respective antenna elements of each pair of antenna elements; the signal strength values from each antenna element are compared for each pair of antenna elements; and, a plurality of comparison results are visually presented on a display as a function of both the comparison result and a parameter related to the position of each of the plurality of mobile stations relative to the location of the base station, whereby differences in reception characteristics between antenna elements of each pair can be detected and such pair can be identified for maintenance.

17 Claims, 6 Drawing Sheets

EXPERT SYSTEM

TECHNICAL FIELD

This invention relates to remote antenna evaluation in mobile telecommunication systems. In particular the invention involves making continuous or periodic measurements on receiving properties of the antennas for maximising performance of the telecommunication system. An Expert System is proposed that remotely evaluates the antenna installations in a defined radio network. The system will be able to present a list of the worst performing units as well as the most likely fault reason. The system will consider the uplink path as well as the downlink paths

BACKGROUND

An important concern for radio network operators is to make sure that their networks provide good coverage. It has been seen that a common reason for loss of coverage and other network problems are related to antenna installation problems. For example could a feeder degradation of only a few dBs affect both uplink and downlink coverage. Such degradation can be hard to find and can be left unnoticed forever. For the operator coverage is directly related to the income. The situation becomes even worse as operators tend to reuse sites for different technologies and sometimes reuse the same antenna equipment.

Today, there are no proper tools or methodology for finding these problems. Only the largest problems will be detected through alarms In a diversity instillation with more than one antenna branch, where one of the received paths is bad or slowly degrading, the uplink diversity will be affected or even lost. Typically base stations or access points for data traffic have two or more receiving antennas and the diversity gain is in the order of 3-5 dB. If an affected antenna path also carries a transmitter then the coverage on the downlink is degraded. For systems with more than one antenna the downlink diversity will be affected or the uplink coverage.

Another problem could be that the antennas are not aligned and thus not covering the same area. Also if the transmitters of the cell are separated, one transmitter on each antenna, then the downlink could be suffering from this misalignment and leading to poor coverage on both uplink and downlink. Similar problems occur in case of mismatch of the antenna diagram on the user side.

Often, third party contractors are responsible for the sites and installation of antennas and the operators have minimal insight in the installation of sites and antenna systems. Common for all these problems are that they are very difficult and some times almost impossible to find.

U.S. Pat. No. 5,970,394 discloses a method of detecting faulty antennas and other components of mobile telephone systems. The method is based on signal strength measurements for detecting inequality in path balance. At least theoretically the signal strength received at the mobile station and the cell site respectively are the same and a statistical analysis is made for the evaluation.

In U.S. Pat. No. 6,266,528 receiving properties of an array of antennas for spatial diversity purposes is described. Long and short term samples of received signal strengths for the respective antenna elements are collected and subjected to a comparing analysis. In US published application 2004/0127261 performance of receive-only diversity antennas with two elements are checked by comparing quality parameters. Ideally there should be no difference and an actual difference could be used for generating an alarm or warning.

SUMMARY

The present invention relates to an expert system, which remotely identifies and presents solutions to antenna problems with multiple antenna elements arranged for diversity reception. The strength of a received signal (RXLEV in GSM, RSCP in WCDMA or corresponding terms in other standards) is measured in the antenna elements of a base station. A number of samples of the difference between signal strength for pairs of antenna elements are created and the differences for the respective element pairs are expressed as a function of the differences in a histogram or other statistical measurement graphs describing the distribution of values. For an ideal perfect antenna pairs the histogram has a narrow top for the differences being zero. For faulty antenna pairs the top is shifted from the zero-value and also widened depending on the character of the fault. The histogram can also be used for evaluating the coverage properties and by taking positioning data of the user equipment into consideration.

Generally a comparison between signal strength data received in the respective antenna elements are used according to a principal aspect of the inventive concept. Alternative to the difference between the pair of data is the quotient between the two values. In systems with more than two diversity antennas, the antennas are grouped in pairs for the evaluation or the values are averaged. Other aspects of the invention are using more advanced statistical analysis of the collected data in order to evaluate antenna installations.

The histograms are preferably studied by the operator at a remote place. When a faulty antenna pair is found, the operator may adjust the antenna at the remote place and after a series of new measurements see the result of the adjustment. If it is not possible to make adjustments distantly a technician is sent to the antenna site to make a repair.

The histogram for an antenna pair is primarily based on the received signals from a number of mobile stations positioned in the coverage area for the antenna pair. To further improve the error resolution, statistics from the measurements may be used. Such statistics are filtered on one or several other parameters like path loss, timing advance (according to the GSM-standard) or similar techniques reflecting the distance between the mobile station and the antenna site. More generally any type of positioning tool may be used for filtering the antenna data. In a further embodiment the result is filtered for handover statistics. This will reflect the situation where handovers are most likely to occur, i.e. close to the cell border. Other filtering parameters could be signal quality and power control indicators in system using power control depending on distance to the receiver.

For measuring the signal strengths from different mobile stations a method for distinguishing bursts from different users are needed. This could be the training sequence in GSM, the scrambling code in WCDMA or, e.g. subtones in a OFDM-system.

The evaluation of antenna installations of the invention is adapted to be used for single or groups of installations as well as for a whole network.

The invention is further defined in the appended claims concerning a method and expert system for finding faulty antenna installations.

BRIEF DESCRIPTION OF THE DRAWINGS

The present invention will be more readily understood with reference to the following drawings wherein.

DETAILED DESCRIPTION

Figure 1A:
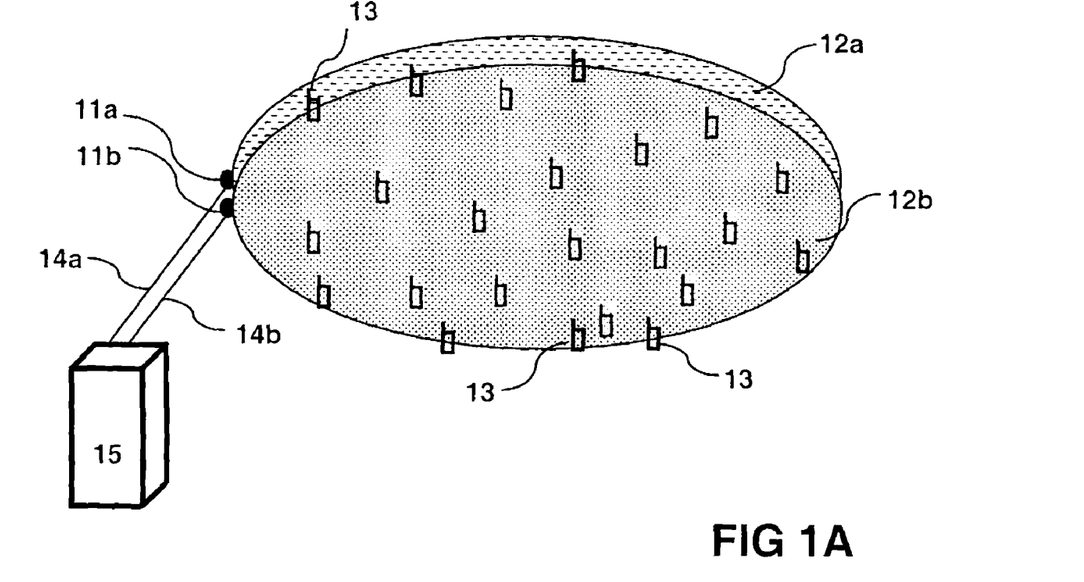
FIG. 1 illustrates the principles of the invention when evaluating a proper antenna installation.
Figure 1B:
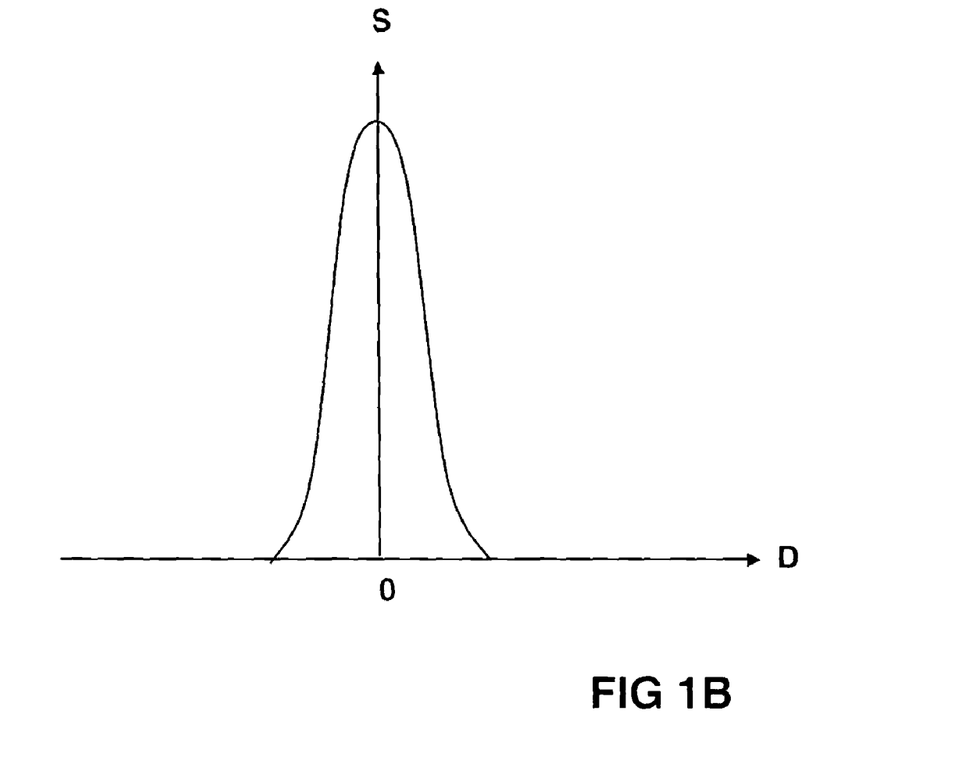

Referring to FIG. 1A there is illustrated two diversity antennas 11a and 11b marked as dots as seen from above. The respective antenna lobes are shown as the areas 12a and 12b. In FIG. 1A the areas cover each other (a certain shift is used for illustrative purposes) and the antenna pail is thus regarded as having its intended coverage. When performing the analysis according to the invention, the received signal strengths RXLEVa and RXLEVb in antennas 11a and 11b respectively transmitted by a number of more or less evenly scattered mobile stations 13 are measured. The antenna elements 11a and 11b are connected via feeders 14a and 14b to a radio base station, RBS, 15 and a difference value is created for a number of received signal pairs in the RBS. The histogram of FIG. 1 B shows the number of samples S for difference values as a function of the difference $$D = RXLEVa - RXLEVb.$$

FIG. 1B confirms that the installation of FIG. 1A is acceptable. The curve has a slight width due to imperfection in the measurements and multipath propagation of the radio signals, but the main thing for an acceptable antenna is that the curve is centered on a zero difference. If the quotients between the two values were displayed, the center would be around one.

Figure 2A:
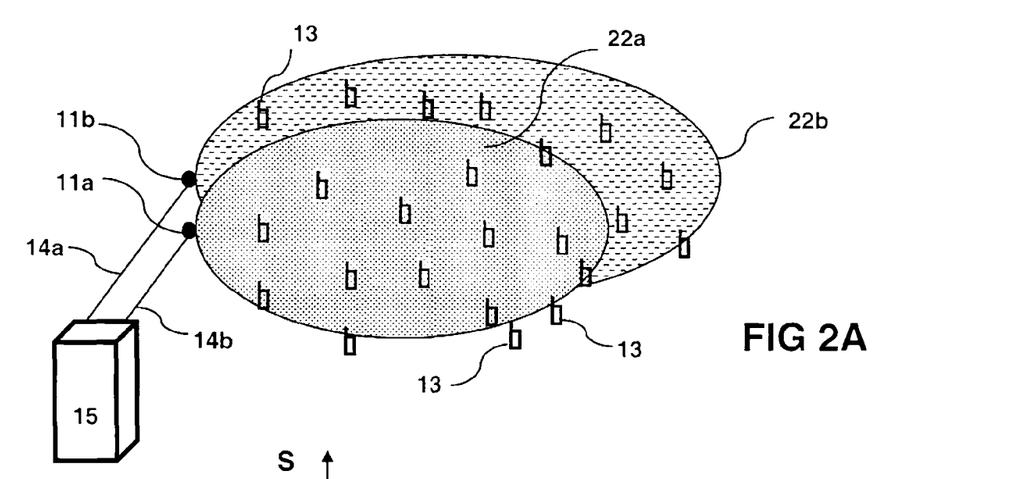
FIG. 2 shows an installation with path loss in one antenna branch.
Figure 2B:
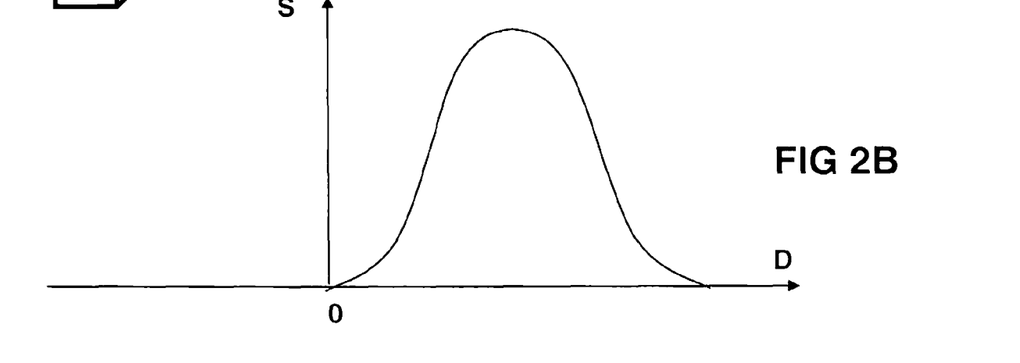
Figure 2C:
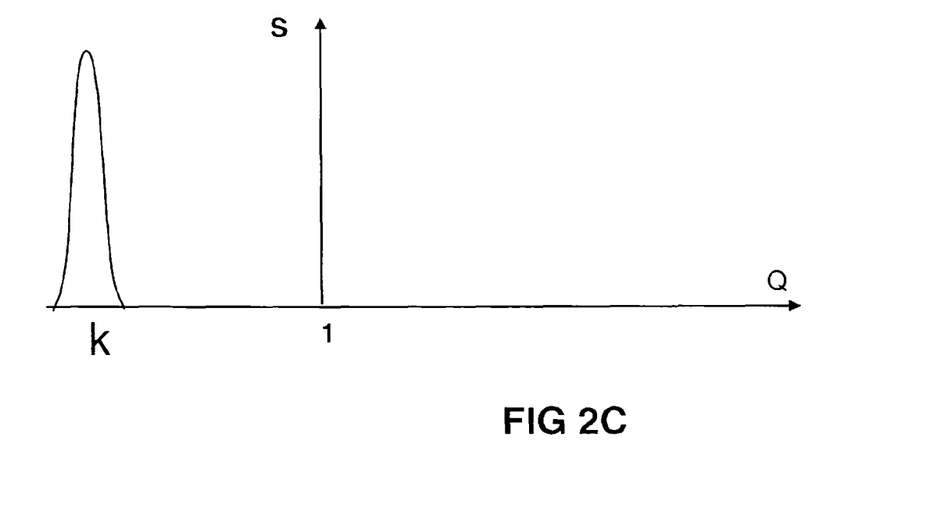

FIG. 2A shows a situation where the attenuations in the antenna elements 11a and 11b are different caused for example by a tilt of one of the antennas in the intended radiation direction or a bad connection between one of the antenna element and its feeder. This will lead to different extension of the coverage of each antenna branch. Lobe 22b is "longer" than 22a as shown in the figure. The difference in received RXLEV for the respective branches of the antenna is illustrated by the shift of the top in the histogram of FIG. 2 B compared to the ideal situation of FIG. 1 B. The top is also widened because the RXLEV difference varies depending on the varying distance to the mobile stations. It is assumed that the signal strength in dB varies linearly with distance. If the quotient RXLEVa/RXLEVb=Q instead of the absolute difference is used this will not happen and the quotient is constants k, see FIG. 2C.

Figure 3A:
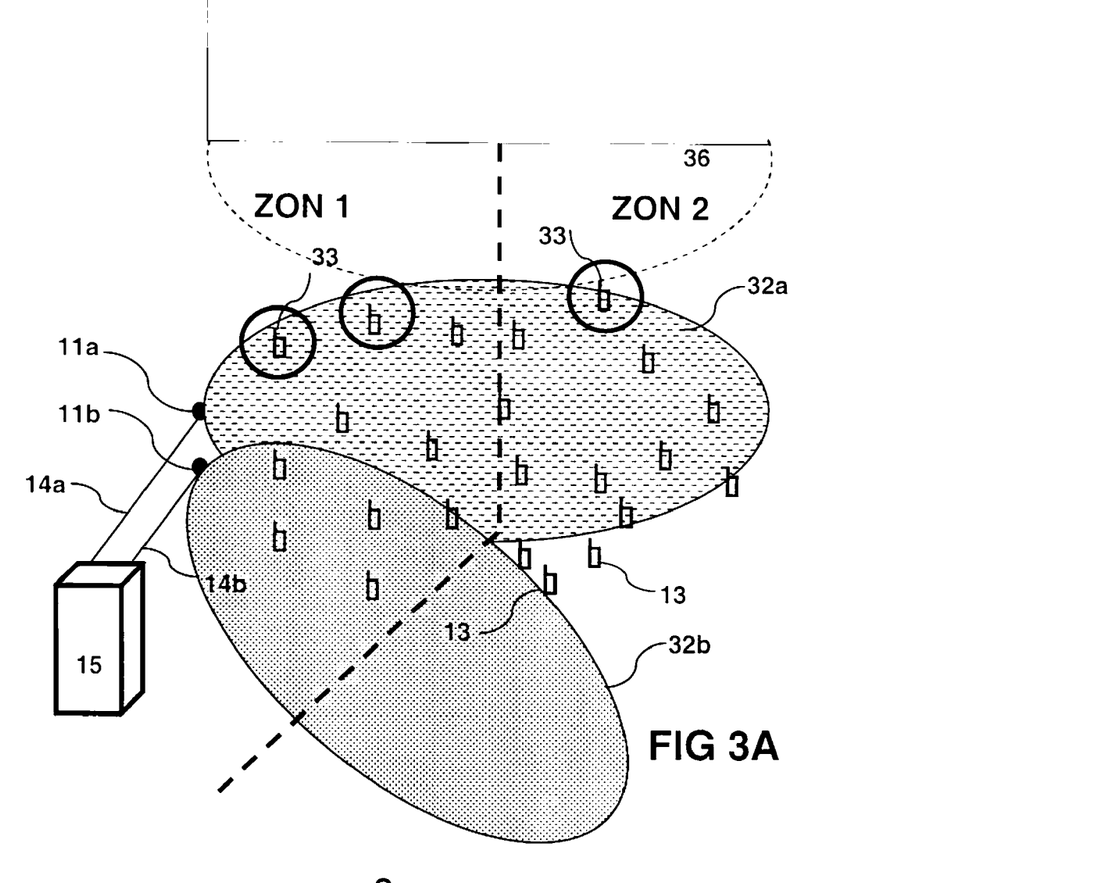
FIG. 3 shows antenna mismatch and swapped feeders.
Figure 3B:
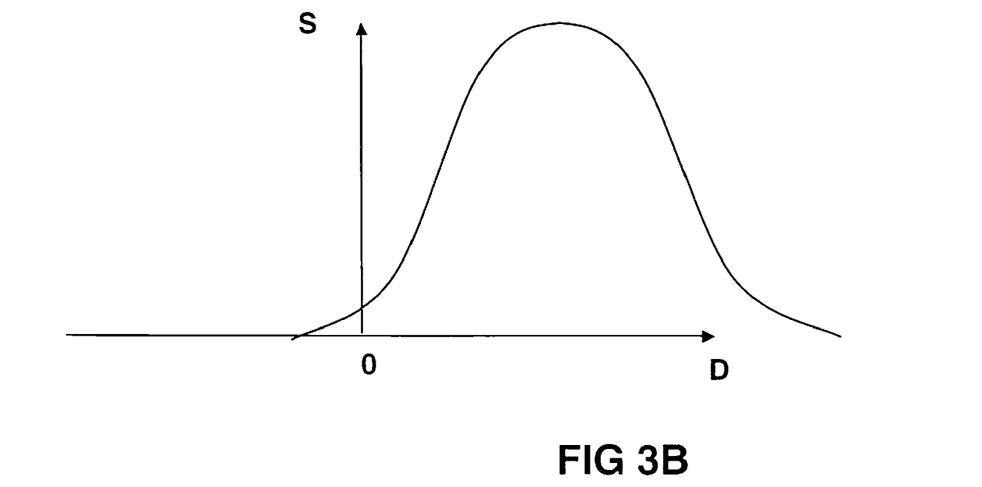

In FIG. 3A there is an angle between the directions of the two antenna lobes 32a and 32b, which may be caused by a tilt of one of the branches out of the main direction—a mismatch of the antenna diagrams has occurred. It is assumed in this example that the attenuation or length of the coverage areas are the same—like in FIG. 1A. For measured mobile stations near the antenna the difference samples will be quite closely centered to zero but the top is widened—the number of mobile stations are the same in both lobe 32a and 32b in the illustration of FIG. 3A. Further out there are more mobiles in lobe 32a for the intended direction of the antenna than in lobe 32b. This will shift the top. A typical average result is shown in FIG. 3B.

Figure 3C:
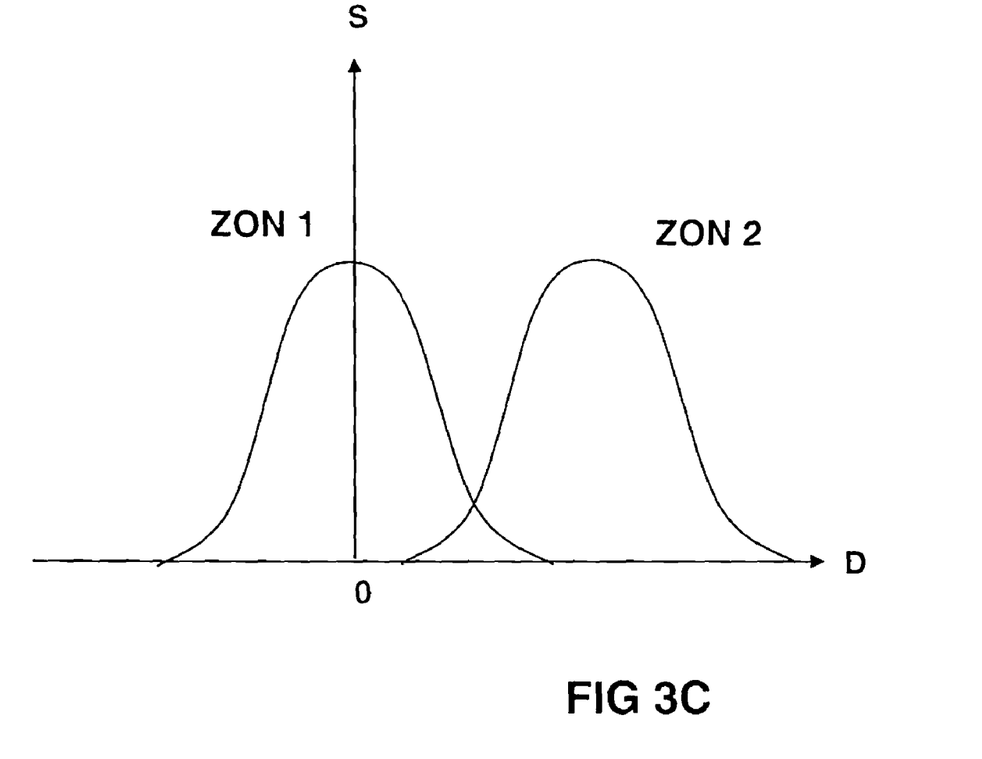

If the coverage area of the antenna of FIG. 3A is divided into two parts, Zone 1 and Zone 2, a more distinct result may be obtained. In Zone 1 the timing advance of the mobile stations is below a certain threshold, and in Zone 2 they are above. The same principal result would be obtained if the threshold dividing the cell into Zone 1 and 2 is represented by a certain level of the signal strength. RXLEVa or RXLEVb. As seen in FIG. 3C the respective zones give different result. If the majority of mobiles are positioned in the "correct" area, i.e. lobe area 32a of FIG. 3A, the difference histogram for Zone 2 will be shifted further away from zero then the histogram for Zone 1. That is because, as mentioned above, there are more reporting mobile stations 13 in the area 32a than in area 32b. In Zone 1 there are an equal amount of reporting mobile stations in the respective areas 32a and 32b.

Figure 3D:
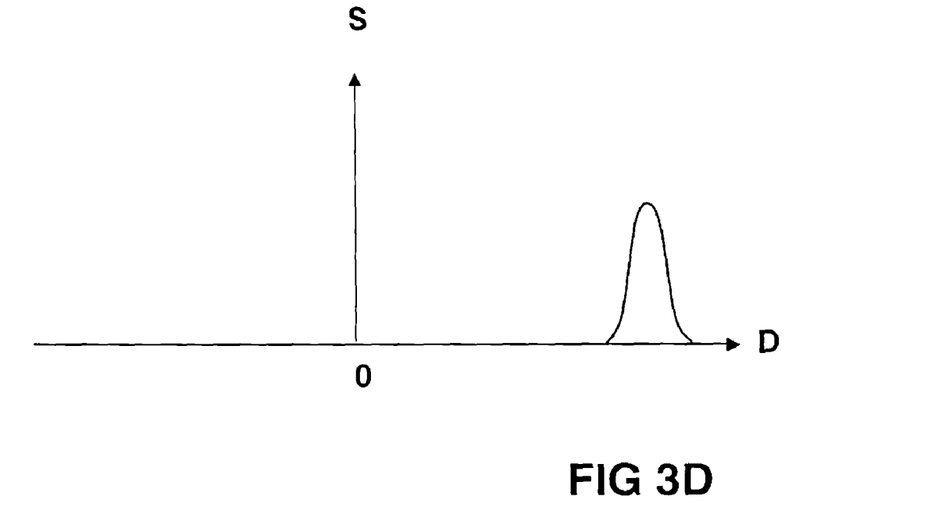

Another parameter to be used for enhancing the result is to measure on mobile stations, which have recently performed handover from a neighbouring cell. Part of such a cell 36 is shown in dotted lines above the studied cell. Examples of mobile stations 33, which have performed handover and entered the studied cell, are encircled in FIG. 3A. If just such mobiles are included in a measurement report a very clear indication of that something is wrong will be apparent from FIG. 3D.

The antennas 11a and 11b could also be used for transmitting. If the antennas 11a and 11b, so far discussed, the first one 11a is used for the Broadcast Control CHannel. BCCH, together with a number Traffic Channels, TCH, and the other one, 11b, mostly for TCHs, trouble might occur. A user, who is about to enter the studied cell, for example from the neighbouring cell 36, can be assigned a TCH either from antenna 11a or 11b. If the person gets a TCH from 11a everything seems to be OK, but if a TCH from 11b a rather bad, if any, connection will be the result, although the BCCH was strong enough. By evaluating the antenna installations according to the invention such problems are avoided.

Figure 4:
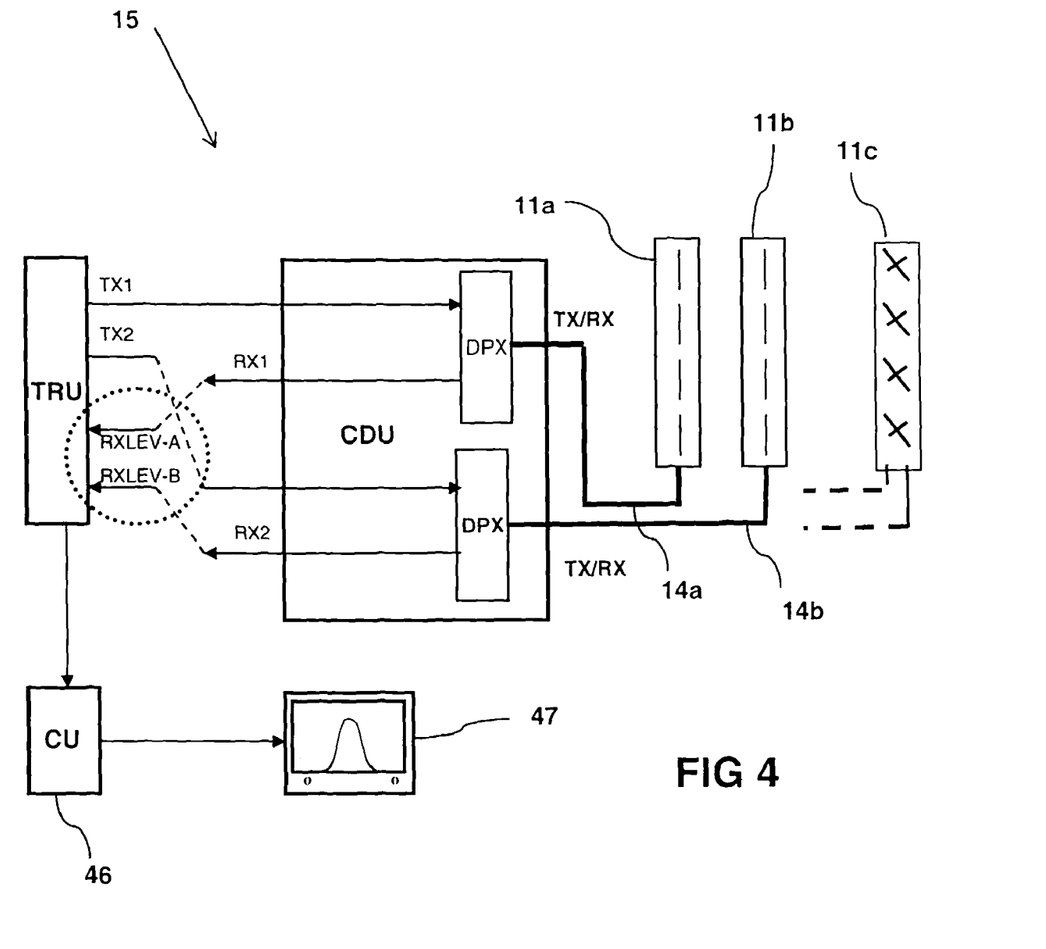
FIG. 4 presents the equipment used when performing the invention.

It sometimes happens that feeders are swapped, i.e. a feeder for an intended antenna sector is by mistake connected to another sector. The angle between the lobes 32a and 32b, as principally illustrated in FIG. 3A, will then be substantial, equal to the angle between the sectors. Even that mistake can be left unattended to, especially if the antennas are used only for reception purposes. The diversity effect will however be lost. With measurements made according to the invention this kind of fault can easily be detected FIG. 4 shows the equipment used when performing the invention. To the left the radio base station. RBS, generally referenced as 15, is illustrated. The RBS comprises a transceiver unit, TRU, with two transceivers, TRX, and a combiner, CDU. The CDU includes duplexing units. DPX which combine or separate the transmitted, TX, or received, RX, signals respectively. The duplexed signals, TX/RX, are transported over the feeders 14a/14b to/from vertically polarized antennas 11a/11b. As an alternative a cross polarized antenna 11c is utilized. In the TRU the RX-signals are received. Parameters like the RXLEV-values are registered and transferred to a computing unit 46, where the data are processed according to the principles of the present invention. The result is displayed as graphs or data on a monitor screen 47.

A further way of presenting the results according to the invention is in the form of a list as a generic user interface (GUI). The table below shows an example of such a list.

| Cell name | TG No | TRX No | RXLEV_Diff_average | RXLEV_Diff_std | Fault Indicator |
|---|---|---|---|---|---|
| Cell 1 | 1 | 1 | 1 | 3 | 0 |
| Cell 1 | 1 | 2 | 0 | 2 | 0 |
| Cell 1 | 1 | 3 | 5 | 3 | 1 |
| Cell 2 | 1 | 4 | 3 | 5 | 2 |
| Cell 2 | 1 | 5 | −3 | 5 | 2 |
| Cell 2 | 2 | 1 | −1 | 11 | 3 |

The first three columns indicates the transceiver TRX (belonging to a certain transceiver group TG in a certain cell) for which the antenna is being tested. Columns 4 and 5 show the average RXLEV difference and standard deviation respectively. Another significant factor would be the number of samples (not in the table). A great number, at least several hundreds of measurement, will lead to a higher predictability or quality of the evaluation. A fault indicator in the last column presents the result. In the table example the following indicators are presented.

0. No fault or inconclusive (c.f. FIG. 1)
1. Losses in RF path (c.f. FIG. 2
2. Antenna diagram mismatch (c.f FIG. 3)
3. Swapped feeders between sectors In some systems transmit-only antennas are used. Even with such antennas the concept of the present invention can be used, by utilising the inherent receiving properties that most transmitting antennas have. It is possible to create a dummy RX path that can be compared with a regular RX path or two dummy RX paths can be created that can be used to calculate a RX difference. The same applies for an antenna pair supposed to cover the same area on different channels. Such a transmitting antenna pair can be evaluated by eavesdropping of transmitters out there in the supposed coverage area. The dummy receptions from those transmitters are used for the evolution of the antenna installation.

Figure 5:
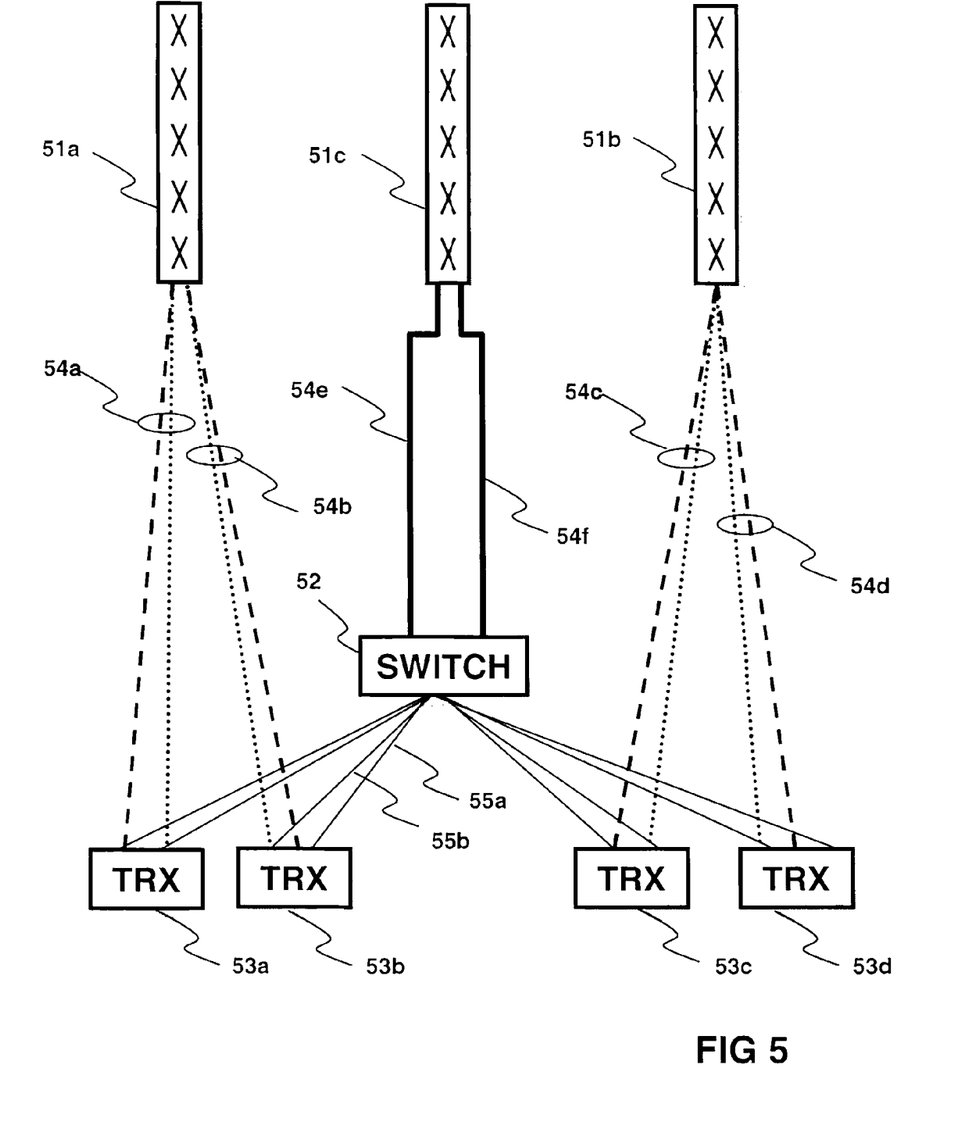
FIG. 5 is an example of an antenna installation with several antennas which can be analysed with the help of the invention.

FIG. 5 illustrates an example of a typical transceiver group, with three cross-polarised diversity-antennas supposed to cover the same cell area. The croup comprises two transmit-only TX-antennas 51a, 51b and one receiving RX-antenna 51c. The two TX-antennas are connected to two TRXs each, 53a, 53b and 53c, 53d, in the base station via feeders 54a, 54b and 54c, 54d respectively. For illustrative purposes the duplexed feeders 54a-d are divided into one TX path (dashed) and one dummy RX path (dotted). The received diversity signals in the RX-antenna 51c are, via feeders 54e and 54f, transferred to a switch 52 in the base station. In the switch the received signal pair is distributed to each of the four TRXs via four connection pairs 55a, 55b. The antenna installation of FIG. 5 could be evaluated according to the invention with up to six received RX values, which ideally are all equal. In the TRX 53a and 53b for example received dummy signals from TX-antenna 51a are compared with each other or signals from the and RX-antenna. In the CU 46 (FIG. 4) up to six different pairs could be presented in accordance with the examples described in FIG. 1-3. By treating the different values in pairs, by averaging or other statistical methods, a comprehensive evaluation of the antenna installation performance is made possible.

The curves of FIG. 1-3 are all symmetrical, but in reality it happens that the curves are skewed to a certain extent. There could also be more than one maximum. Such deviations may also be included in the antenna evaluation process beside the shift and width mentioned above.

While certain embodiments of the invention have been shown and disclosed, it should be understood that numerous changes and modifications may be made by those skilled in the art without departing from the scope of the invention as defined in the following claims.

The invention claimed is:

1. A system for remotely evaluating antenna installations in a mobile radio communication system, wherein each antenna installation comprises at least one pair of antenna elements arranged for diversity reception, comprising:
means for measuring the received signal strength from a plurality of mobile stations at the respective antenna elements of each pair of antenna elements;
means for comparing the signal strength values from each antenna element of each said pair of antenna elements; and,
means for visually presenting a plurality of comparison results on a display as a function of both the comparison result and a parameter related to the position of each of said plurality of mobile stations relative to the location of the base station, whereby differences in reception characteristics between antenna elements of each pair can be detected and such pair can be identified for maintenance.

2. The system of claim 1, wherein the comparison is the difference of signal strength in pairs of antenna elements.

3. The system of claim 1, wherein the comparison is the quotient of signal strength values in pairs of antenna elements.

4. The system of claim 1, wherein the comparison is the average of signal strength values in a number of antenna elements.

5. The system of claim 1, wherein the parameter is the timing advance or the transmission path loss of the mobile stations.

6. The system of claim 1, wherein the parameter is recently made handovers from a neighbouring cell for the measured mobile stations.

7. The system of claim 1, wherein the function of the comparison is displayed on a device in the form of a histogram.

8. The system of claim 1, wherein the evaluation result is presented as a list indicating transceiver groups tested and a fault indicator describing the result of the evaluation.

9. A method for remotely evaluating antenna installations in a mobile radio communication system, wherein each antenna installation comprises at least one pair of antenna elements arranged for diversity reception, comprising the steps of:
measuring the received signal strength from a plurality of mobile stations at the respective antenna elements of each pair of antenna elements;
comparing the signal strength values from each antenna element of each said pair of antenna elements; and,
visually presenting a plurality of comparison results on a display as a function of both the comparison result and a parameter related to the position of each of said plurality of mobile stations relative to the location of the base station, whereby differences in reception characteristics between antenna elements of each pair can be detected and such pair can be identified for maintenance.

10. A system for remotely evaluating antenna installations in a mobile radio communication system, wherein each antenna installation comprises at least one pair of antenna elements arranged for diversity reception, comprising:
means for measuring the received signal strength from a plurality of mobile stations at the respective antenna elements of each pair of antenna elements;

means for comparing the signal strength values from each antenna element of each said pair of antenna elements; and, means for visually presenting a plurality of comparison results on a display as a function of both the comparison result and a parameter related to the position of each of said plurality of mobile stations relative to the location of the base station, whereby differences in reception characteristics between antenna elements of each pair can be detected and such pair can be identified for maintenance;

wherein the radio base station comprises a transceiver group with several diversity antenna elements covering the same cell area and wherein at least some of the antenna elements are transmit-only antennas and that the evaluation is based on comparison of received dummy receptions from the transmit-only antennas with or without combination with receptions in the other diversity antennas.

11. The system of claim 10, wherein the comparison is the difference of signal strength in pairs of antenna elements.

12. The system of claim 10, wherein the comparison is the quotient of signal strength values in pairs of antenna elements.

13. The system of claim 10, wherein the comparison is the average of signal strength values in a number of antenna elements.

14. The system of claim 10, wherein the parameter is the timing advance or the transmission path loss of the mobile stations.

15. The system of claim 10, wherein the parameter is recently made handovers from a neighbouring cell for the measured mobile stations.

16. The system of claim 10, wherein the function of the comparison is displayed on a device in the form of a histogram.

17. The system of claim 10, wherein the evaluation result is presented as a list indicating transceiver groups tested and a fault indicator describing the result of the evaluation.

* * * * *